(12) United States Patent
Oane et al.

(10) Patent No.: US 9,634,909 B2
(45) Date of Patent: Apr. 25, 2017

(54) METHODS AND SYSTEMS OF DETECTION OF MOST RELEVANT INSIGHTS FOR LARGE VOLUME QUERY-BASED SOCIAL DATA STREAM

(71) Applicants: Vladimir Oane, Ramnicu Valcea (RO); Bogdan Sandulescu, Ramnicu Valcea (RO)

(72) Inventors: Vladimir Oane, Ramnicu Valcea (RO); Bogdan Sandulescu, Ramnicu Valcea (RO)

(*) Notice: Subject to any disclaimer, the term of this patent is extended or adjusted under 35 U.S.C. 154(b) by 722 days.

(21) Appl. No.: 13/873,807

(22) Filed: Apr. 30, 2013

(65) Prior Publication Data
US 2013/0304819 A1 Nov. 14, 2013

Related U.S. Application Data

(60) Provisional application No. 61/640,175, filed on Apr. 30, 2012.

(51) Int. Cl.
| G06F 15/16 | (2006.01) |
|---|---|
| H04L 12/26 | (2006.01) |
| H04L 12/58 | (2006.01) |
| G06Q 50/00 | (2012.01) |
| G06F 17/30 | (2006.01) |

(52) U.S. Cl.
CPC ........ H04L 43/04 (2013.01); G06F 17/30861 (2013.01); G06Q 50/01 (2013.01); H04L 51/32 (2013.01)

(58) Field of Classification Search
CPC .... G06Q 50/01; G06Q 30/0201; G06Q 30/02; H04L 67/22; H04L 65/403; H04L 29/06; H04W 4/206; G06F 17/30861

USPC ......... 709/206, 204; 705/7.29; 707/722, 754
See application file for complete search history.

(56) References Cited

U.S. PATENT DOCUMENTS

| 7,689,455 B2* | 3/2010 | Fligler ............... G06Q 10/0639 705/7.38 |
|---|---|---|
| 8,060,492 B2 | 11/2011 | Nair |
| 2010/0153404 A1 | 6/2010 | Ghosh et al. |
| 2011/0153502 A1 | 6/2011 | Jean-Claude |
| 2011/0231416 A1 | 9/2011 | Goodchild Drake |
| 2011/0282860 A1 | 11/2011 | Baarman et al. |
| 2011/0295626 A1 | 12/2011 | Chen et al. |
| 2011/0307397 A1 | 12/2011 | Benmbarek |
| 2012/0296991 A1* | 11/2012 | Spivack ................. G06Q 10/10 709/206 |
| 2013/0298038 A1* | 11/2013 | Spivack ................ H04L 65/403 715/753 |
| 2015/0106155 A1* | 4/2015 | Castellanos ........ G06Q 30/0201 705/7.29 |

OTHER PUBLICATIONS

International Search Report (pp. 1-3) for PCT/US2013/038949.
International Search Report (pp. 1-5) for PCT/US2013/38954.

* cited by examiner

*Primary Examiner* — Frantz Jean
(74) *Attorney, Agent, or Firm* — JWIP & Patent Services, LLC; Jacob G. Weintraub, Esq.

(57) ABSTRACT

The present invention relates to novel methods and implementing systems that afford a user the ability to automatically analyze all mentions and metrics/analytics of any query-based social data stream, and detect mentions or analytics that can be classified as important for a user of that stream.

20 Claims, 1 Drawing Sheet

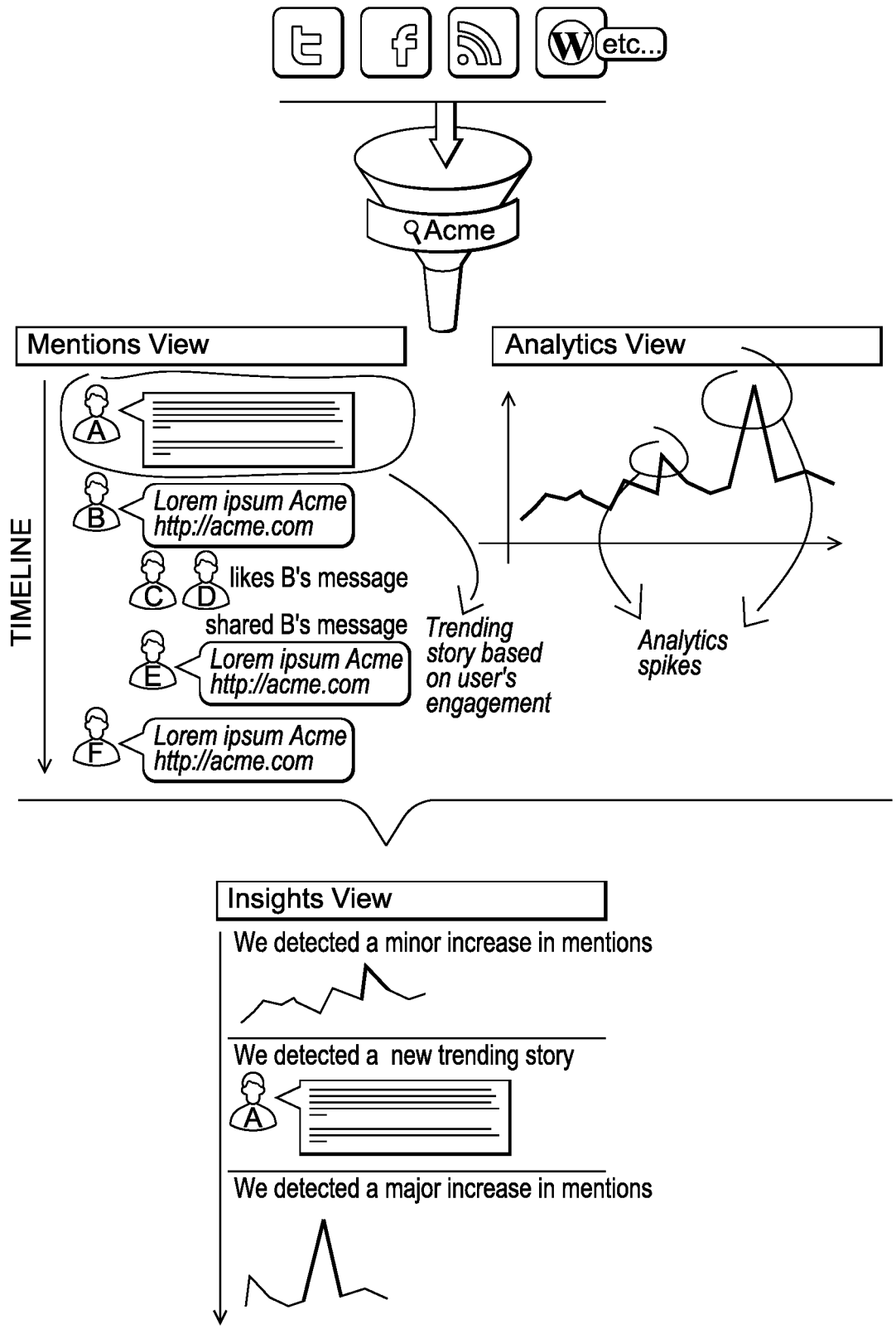

US 9,634,909 B2

METHODS AND SYSTEMS OF DETECTION OF MOST RELEVANT INSIGHTS FOR LARGE VOLUME QUERY-BASED SOCIAL DATA STREAM

RELATED APPLICATIONS

This application claims the benefit of priority from U.S. Provisional Patent Application No. 61/640,175, filed on Apr. 30, 2012, the entirety of which is incorporated herein by reference.

BACKGROUND OF THE INVENTION

In the last 10 years social media has effectively changed the way people communicate online. Millions of blogs, or services like Twitter and Facebook enabled new ways of expression for people worldwide. Billions of messages, blog posts, pictures, videos etc are published on a daily basis. As such, it has become very important for companies to find a way to analyze this real-time stream of information.

Many companies use a social monitoring service like uberVU that offer systems to collect all mentions of a specific brand, a product, or an event. The way this usually works is by creating a persistent search, which will constantly collect and analyze all the new mentions of a specific brand, a product, or an event. However, this may require a big brand to collect and analyze potentially multiple millions of mentions on a weekly basis; particularly, if it tracks the brand, products, and/or competitors.

With the total amount of data being so great, it becomes impractical, or even impossible, to sort through and consider this monitored activity. Moreover, generating useful insights that account for this data becomes equally daunting. As such, there is a desperate need for a system to sort through large data sets from social monitoring that can analyze and detect patterns or things that are out of the ordinary.

SUMMARY OF THE INVENTION

The present invention relates to methods and systems of detection of the most relevant insights for any large volume query-based social data stream (e.g., key words and phrases, search terms, search results, or combination thereof, including semantic matches thereof). In particular, the methods and systems are able to automatically analyze all the mentions and metrics/analytics of any query based social data stream, and detect mentions or analytics that can be classified as important for a user of that stream.

Accordingly, one aspect of the invention provides a system comprising a machine-readable medium having instructions stored thereon for execution by a processor to perform a method for detection of the most relevant insights for any large volume query-based social data stream comprising the steps of interfacing with one or more streaming social data sources; collecting one or more mentions that match a search query; storing said mentions on a first server; enhancing said mentions with additional information to produce enhanced mentions; storing said enhanced mentions on a second server; filtering said enhanced mentions into filtered streams; aggregating statistical data of said filtered streams; and analyzing for an anomaly in the statistical data of said filtered streams to detect the most relevant insights.

In another aspect, the invention provides a method for detection of the most relevant insights for any large volume query-based social data stream comprising the steps of interfacing with one or more streaming social data sources; collecting one or more mentions that match a search query; storing said mentions on a first server; enhancing said mentions with additional information to produce enhanced mentions; storing said enhanced mentions on a second server; filtering said enhanced mentions into filtered streams; aggregating statistical data of said filtered streams; and analyzing for an anomaly in the statistical data of said filtered streams to detect the most relevant insights, such that the most relevant insights for the streaming social data sources is detected.

BRIEF DESCRIPTION OF DRAWINGS

FIG. 1 depicts the flow of data from social media through a system of the present invention using a method of the present invention.

DETAILED DESCRIPTION OF THE INVENTION

The present invention provides novel methods and implementing systems that afford a user the ability to automatically analyze all mentions and metrics/analytics of any query-based social data stream, and detect mentions or analytics that can be classified as important for a user of that stream.

The present invention, including novel methods and systems will be described with reference to the following definitions that, for convenience, are set forth below. Unless otherwise specified, the below terms used herein are defined as follows:

I. DEFINITIONS

As used herein, the term "a," "an," "the" and similar terms used in the context of the present invention (especially in the context of the claims) are to be construed to cover both the singular and plural unless otherwise indicated herein or clearly contradicted by the context.

The language "and/or" is used herein as a convention to describe either "and" or "or" as separate embodiments. For example, in a listing of A, B, and/or C, it is intended to mean both A, B, and C; as well as A, B, or C, wherein each of A, B, or C is considered a separate embodiment, wherein the collection of each in a list is merely a convenience.

The language "application programming interface (API)" is art-recognized to describe a protocol intended to be used as an interface by software components to communicate with each other.

The term "interfacing" as used herein, for example in the expression "interfacing with one or more streaming social data sources," describes the means of communication between two entities, for example a system and a data source. In certain embodiments, the interfacing may be bi-directional. In other embodiments, the interfacing may be uni-directional. In particular embodiments, such interfacing may include receiving, responding, and/or assigning an answer to a request.

The language "machine-readable medium" is art-recognized, and describes a medium capable of storing data in a format readable by a mechanical device (rather than by a human). Examples of machine-readable media include magnetic media such as magnetic disks, cards, tapes, and drums, punched cards and paper tapes, optical disks, barcodes, magnetic ink characters, and solid state devices such as flash-based, SSD, etc. Common machine-readable technologies include magnetic recording, processing waveforms, and barcodes. In particular embodiments, the machine-readable device is a solid state device. Optical character recognition (OCR) can be used to enable machines to read information available to humans. Any information retrievable by any form of energy can be machine-readable. Moreover, any data stored on a machine-readable medium may be transferred by streaming over a network.

The language "most relevant insights" as used herein, describes insights based on recognizing patterns that can enable or suggest action for a user of that stream due to their increased degree of relevancy.

The language "social media insights" or "insights" are used interchangeably herein to describe recognizable patterns derived from social media data.

The language "uniform resource identifier (URI)" is art-recognized to describe a string of characters used to identify a name or a web resource.

The language "Uniform Resource Locator (URL)" is art-recognized to describe a formatted text string used by web browsers, email clients and other software to identify a network resource on the internet.

The term "user" is used herein to describe any person that interacts with the systems of the present invention. In certain embodiments, such users may include a person, or a corporate entity represented by one or more persons.

The term "spike" is used herein describes a social media insight that represents a sudden increase in social media activity, e.g., data volume for a given stream and/or attributes combination. In one example, the stream tracking a company's competitor is having a large spike in negative mentions, which means massive bad publicity for the competitor; which could mean a potential business opportunity for a company (e.g., how News.me leveraged the closedown of Google Reader in order to gain a larger userbase).

The term "burst" is used herein to describe a spike that shows sustained over-the-average activity. For example, spikes, which are not so volatile (such as an intelligent political move on social media), may turn into bursts of sustained large activity showing potential future trends.

The language "top story" is used herein to describe an online resource for which there is a large spike in social media activity within a data stream. For example, if a newspaper has published a review of a product, and that review goes viral (e.g., people start sharing it, etc.), it will show up as a top story in the product's stream.

II. METHODS OF THE INVENTION

In one embodiment, the present invention provides a method for detection of the most relevant insights for any large volume query-based social data stream comprising the steps of
  interfacing with one or more streaming social data sources;
  collecting one or more mentions that match a search query;
  storing said mentions on a first server;
  enhancing said mentions with additional information to produce enhanced mentions;
  storing said enhanced mentions on a second server;
  filtering said enhanced mentions into filtered streams;
  aggregating statistical data of said filtered streams; and
  analyzing for an anomaly in the statistical data of said filtered streams to detect the most relevant insights,
such that the most relevant insights for the streaming social data sources is detected.

In another embodiment, the method further comprises the step of identifying an anomaly.

In another embodiment, the method further comprises the step of reporting one or more of the most relevant insights.

In certain embodiments, the first server is the same as the second server.

In certain embodiments, the step of collecting the mentions further comprises establishing a search inquiry, e.g., an iterative search query.

In certain embodiments, the step of collecting the mentions may be limited by prescribed time interval or may be continual.

In certain embodiments of the invention, the data stream comprises greater than 500,000 mentions, e.g., greater than 1,000,000 mentions, e.g., greater than 2,000,000 mentions, e.g., greater than 5,000,000 mentions, e.g., e.g., greater than 10,000,000 mentions.

In certain embodiments, the method further comprises the step of generating a list of the most relevant insights.

A. Data Collection

In the methods of the present invention, the data analyzed is in the form of mentions. A "mention" is a post originated on a social media platform, and associated information. Mentions are usually collected by matching certain keywords using queries or by matching certain mentions parameters. In certain embodiments, a mention may comprise an author; a date, a main message (depending on the type this can be text, image, video, audio or a combination thereof). In a particular embodiment, the mention may comprise a location where the mention was created (either as GPS coordinates or text), a comment thread, and/or the number and list of people who liked or favorited the mention.

Collection of all the mentions from a query-based social data stream, i.e., derived from data streams that match a specific query (e.g., key words and phrases, search terms, search results, or combination thereof, including semantic matches thereof) may be made from any available social network. This step of collection ensures that the stream being analyzed is related to the topic of interest, i.e., the query, to identify influencers.

The sources of data may be any social network (e.g., Twitter, Facebook, Google+, Pinterest, Instagram, LinkedIn etc) or websites where an author can be uniquely identified (e.g., blogs, boards, etc). Access to this data may be acquired in a variety of ways. In certain embodiments, the data may be acquired through data partnerships with the main social media players or data reseller, publicly available API (application programming interface), and/or scraping or other forms of HTML manipulation.

In certain embodiments, information related to authors may be comprise one or more of the following: a name: either as a nickname or full name (real or invented), a picture or a set of pictures, a description, and/or a list of other website and social profiles the user can be found on. In alternative embodiments, information related to authors may be comprise a URI (uniform resource identifier).

The amount of data collected may depend upon the slice of the timeline, or time interval, which is being analyzed. For example, it could be a day, a week or a month. In certain embodiments, for real-time results the slice should be as small as possible, probably hours.

In certain embodiments, the invention is supported by methods and systems that allow queries from different users to be saved & managed. In certain embodiments, a mechanism to collect data that match those queries may be included, and can be part of the same backend system. In particular embodiments, the mentions collected for those queries may also be annotated with meta-information, e.g., as much as possible; including the location, the language or the platform of the mention. In a specific embodiment, the back end system may create archives of all the mentions collected. In such cases, a record of all the messages posted about a specific topic is presented, and the historical record may be as long as the period needed for which to provide influence.

B. Data Enhancement

In the methods of the present invention, the collected mentions are enhanced. Such enhancements are applied on mentions to provide additional information to be stored on the server along with the mentions, i.e., producing enhanced mentions, and assist in filtering the data. In certain embodiments, these enhancements may include one or more of the following: the sentiment of the mention, i.e., whether the author has a positive, negative or neutral opinion on the subject in discussion; the language of the mention; the location: city, country; the gender of the author; the potential reach of each mention, i.e., how many people will read it; and the following of an author.

C. Data Filtering

In the methods of the present invention, the data is filtered into streams, e.g., using the enhancement added to the mention. The importance of this filtering is it separates the global conversation into a meaningful subset. In certain embodiments, the stream is ordered by time, i.e., meaning the most recent mentions are at the top. Each enhanced mention is filtered, and will have some detectors, or filters, that will go through each to create a filtered stream, which may be analyzed to provide statistical data, e.g., numerically or graphical in nature.

Mentions and streams are saved, e.g., in databases, on a server. The types server and/or the database depend on the volume of data and the desired use of the data, e.g., wherein the data is accessed by a specific timeframe. Moreover, two pieces of information on which computation of social spikes may be based, may be stored on the server: the raw mention data, and the statistics gathered from those mentions.

In certain embodiments, the method is capable of detecting people influencing the social conversation for a specific, topic. This is achieved by filtering the conversations from which the mentions derive into streams. The most popular filtering stream is by keyword matching using boolean operators. For example, the topics for filtering may be selected from one or more of brand names, product names, names of persons, campaigns or events, and market terms. Moreover, in certain embodiments, the streams can be further filtered down using generic terms such as: location, e.g., just for mentions in Brazil; language, e.g., people speaking Japanese; social network, e.g., on Twitter®; sentiment, e.g., people saying nice things about Xbox®; and gender, e.g., women discussing the new maternity laws.

D. Insight Detection

In the methods of the present invention, an insight may be detected as an anomaly in the statistical data aggregated by analysis of the filtered streams. In certain embodiments, the detection of the most relevant insights may trigger an alert.

In certain embodiments, as mentions are gathered from social media, they may be indexed and/or statistical information may be stored about the mentions in the streams defined by the users around one or more of the following attributes: language in which the mention was written; location from which the mention was posted, e.g., this can be determined at a granular level sometimes (via geo-tagging information), or even estimated on any other number of factors (such as the places from where the author usually posts at this hour); sentiment of the mention within the context of the stream; gender of the author; platform; network size of the author; and URLs contained within the mention For any combination of such attributes, the data may be aggregated in real-time, e.g., to provide real-time, e.g., accurate, statistics. For example, it is possible to count how many positive mentions there are for a brand and contain today's article from New York Times referencing the brand (sentiment+URL filtering). Together with actual numbers (how many females from California have posted on Facebook® about the brand in the past week?), this aggregation system is also able to derive information of statistical significance such as the expected values for number of female posts on Facebook® at this time of day. In certain embodiments, the aggregation may be triggered for each combination of attributes in order to obtain social spikes for that sub-view of the stream. For example, a social spike for location=California and gender=female could be used as a possible marketing opportunity or as a confirmation of a successful campaign in offline media.

Each batch of mentions may be aggregated in order to compute the statistics, which is able to trigger a computation of social spikes. The frequency of triggering this computation is, broadly speaking, inversely proportional to stream volume, e.g., on streams with large activity, activity spikes would not be detected for insignificant increases in volume. Conversely, in certain embodiments, streams with extremely low activity should trigger computation immediately, as a small absolute increase in volume can be a huge relative increase.

In certain embodiments, an alert may be scored in importance based on the historic data for that particular stream.

In certain embodiments, an insight alert may comprise a mention from a very influent influencer; a spike in mentions; an increase of buzz from a certain geography; a top of trending story; and/or a mention from a potential lead, e.g., a message that denotes a buying intention.

In certain embodiments, the method further comprises the step of separating signal from noise in a large-volume stream.

III. SYSTEMS OF THE INVENTION

In another embodiment, the present invention provides a system comprising a machine-readable medium having instructions stored thereon for execution by a processor to perform a method for detection of the most relevant insights for any large volume query-based social data stream comprising the steps of
   interfacing with one or more streaming social data sources;
   collecting one or more mentions that match a search query;
   storing said mentions on a first server;
   enhancing said mentions with additional information to produce enhanced mentions;
   storing said enhanced mentions on a second server;
   filtering said enhanced mentions into filtered streams;
   aggregating statistical data of said filtered streams; and
   analyzing for an anomaly in the statistical data of said filtered streams to detect the most relevant insights.

In another embodiment of the system, the method further comprises the step of identifying an anomaly.

In another embodiment of the system, the method further comprises the step of reporting one or more of the most relevant insights.

In certain embodiments of the system, the first server is the same as the second server.

In certain embodiments of the system, the step of collecting the mentions further comprises establishing a search inquiry, e.g., an iterative search query.

In certain embodiments of the system, the step of collecting the mentions may be limited by prescribed time interval or may be continual.

In certain embodiments of the system, the data stream comprises greater than 500,000 mentions, e.g., greater than 1,000,000 mentions, e.g., greater than 2,000,000 mentions, e.g., greater than 5,000,000 mentions, e.g., greater than 10,000,000 mentions.

For each (filtered stream, attributes) combination, social spikes may be computed with an adaptive algorithm depending on the volume of data. If the volume of data is large, the reference timeframe used is smaller (up to 6 hours) in combination with coarser grained statistics (e.g. raw counts), while if the volume of data is smaller, the analyzed timeframe can be extended to several days, in combination with a detail-oriented technique that analyzes each mention in particular.

In certain embodiments, hour-to-hour statistics may be used on the analyzed combination in order to ensure maximal relevance of the results.

In certain embodiments, small volumes of data may be analyzed with a "thumb-up & thumb down" approach. Each increase in volume from one hour to the other is seen as a "thumb up" or "thumb down" whose intensity depends on the elapsed time since it occurred (importance fades as a function of time) and the actual spike in volume compared to the normal volume. The thumbs up and down signals may be aggregated into a single number with a value between 0 and 1, depicting how probable the combination is to receive another mention within the next interval.

In certain embodiments, large volumes of data are generally steadier and may be analyzed using statistical information such as average and standard deviation of: count of actual mentions, reach (followers of the posters who have actually viewed the mentions), and/or other attributes from the given timeframe (social actions like +1's, likes and favorites for posts related to a brand).

In certain embodiments, a hybrid statistical approach adapted to the volume and steadiness of the data stream may be used to surface all interesting combinations of attributes and filters.

In certain embodiments, the instructions stored on the machine-readable medium are online software or offline software.

In certain embodiments, the software is an online application, e.g., a web-based application or a cloud-based application.

In certain embodiments, the software is an offline application.

In certain embodiments, the data is selected from the group consisting of social network or websites where an author can be uniquely identified, and any combination thereof.

In certain embodiments, the machine-readable medium is selected from the group consisting of magnetic media, punched cards, paper tapes, optical disks, barcodes, magnetic ink characters, and solid state devices.

The system, in certain embodiments, may be part of a media monitoring, their engagement console, customer relationship management or analytics service. Moreover, the system may be a web application accessible in an Internet browser, a desktop software running on Windows, Mac OS, Linux (or any other operating system), or a mobile application (available on smartphones or tablets). In certain embodiments, system may display individual streams as a separate view format, or as an aggregate for all the streams, e.g., with this event-detection feature enabled.

In certain embodiments, the system can be delivered as an API method, e.g., which may be accessed remotely by any other software.

In certain embodiments, the real-time aspect of these alerts make them worthy candidates for a mobile implementation. Whenever an insight is detected the application can trigger an alert on the user's mobile.

In certain embodiments, the alerts may be sent as emails, e.g., which can contain all the content of the insight or use a link to the web app.

Social spikes may be displayed in the system in a GUI (graphical user interface) where users can select which social spikes they are interested in, based on streams, group of streams, or their intensity.

Users of the system may also specify both volatile filtering criteria in order to explore the existing social spikes, and persistent ones, causing certain classes of social spikes to never be generated again.

In certain embodiments, the system affords the ability to accept input for the purpose of marking a item of data as not relevant, e.g., providing the ability of the system to learn with respect to refinement and improved insight calculations/analysis. For example, in one embodiment such input may be priority level indicator.

In certain embodiments, the systems of the invention may offer certain additional innovations, for example, (1) the system could require no set-up, i.e., it should just work. In a particular embodiment, the configuration may be the strength of the signals desired for the system to detect (a high strength denotes an important message that should not be missed); (2) the system could offer different out-of the box detectors for different type of insights; and/or (3) the system may use historic data to score the strength of each alert.

In certain embodiments, the system further comprises the step of separating signal from noise in a large-volume stream. For example, rather than spending time looking over every mention or checking all the available analytics to get insights, the system may offer a separate view where all the alerts are collected and displayed to the user. This way the user may quickly identify what happened and when. Such alerts may include but are not limited to: spikes in mentions that may indicate an important event that triggered a lot of buzz, or a story that started trending and picked up a lot of mentions.

In certain embodiments, the system may be used to get alerted in real-time about important social media events. In certain embodiments, such real-time alerts are advantageous in that messages in social media have a very short life-span. For example, once an event happens the timeframe to do anything (e.g., reply to a message, post an official statement in case of a crisis or reply to a complaint) is very short.

In certain embodiments, the system further affords the ability to perform a number of recommended actions on a generated list which are selected from the group consisting of review, publish, respond, tag, share, distribute, and assign task.

In certain embodiments, the system may be used to correlate events with the graphic based metrics. FIG. 1 depicts a system that has detected some insights that may be correlated with a graphic spike for example, then all of them can be displayed on the same canvas. These insights can guide the user in understanding the meaning of those graphs.

In particular, FIG. 1 depicts the data coming in from social media. The mentions are collected, stored, enhanced, and filtered to provide a mention's view: demonstrating a trending story based on user's engagement. Additional application of aggregation of statistical data can provide graphical (or numerical) representation of spikes in the trending story. An alert may then be generated based on the established anomaly or insight, associated with the trending story, and identifying the type of associated mention.

INCORPORATION BY REFERENCE

The entire contents of all patents, published patent applications and other references cited herein are hereby expressly incorporated herein in their entireties by reference.

EQUIVALENTS

Those skilled in the art will recognize, or be able to ascertain using no more than routine experimentation, numerous equivalents to the specific procedures described herein. Such equivalents were considered to be within the scope of this invention and are covered by the following claims. Moreover, any numerical or alphabetical ranges provided herein are intended to include both the upper and lower value of those ranges. In addition, any listing or grouping is intended, at least in one embodiment, to represent a shorthand or convenient manner of listing independent embodiments; as such, each member of the list should be considered a separate embodiment.

What is claimed is:

1. A system comprising a non-transitory machine-readable medium having instructions stored thereon for execution by a processor to perform a method for detection of the most relevant insights for any large volume query-based social data stream comprising the steps of:
   interfacing with one or more streaming social data sources;
   collecting one or more mentions that match a search query;
   storing said mentions on a first server;
   enhancing said mentions with additional information to produce enhanced mentions;
   storing said enhanced mentions on a second server;
   filtering said enhanced mentions into filtered streams;
   aggregating statistical data of said filtered streams; and
   analyzing for an anomaly in the statistical data of each of said filtered streams to detect the most relevant insights using a hybrid statistical approach adapted to the volume and steadiness of the data of the filtered streams, such that the most relevant insights for the streaming social data sources are detected and a real-time alert may be generated based on the detected anomaly or insight.

2. The system of claim 1, wherein the instructions stored on the machine-readable medium are online software or offline software.

3. The system of claim 1, wherein the software is an online application.

4. The system of claim 3, wherein the software is a web-based application.

5. The system of claim 3, wherein the software is a cloud-based application.

6. The system of claim 1, wherein the software is an offline application.

7. The system of claim 1, wherein the data sources are selected from the group consisting of social network or websites where an author can be uniquely identified, and any combination thereof.

8. The system of claim 1, wherein the machine-readable medium is selected from the group consisting of magnetic media, punched cards, paper tapes, optical disks, barcodes, magnetic ink characters, and solid state devices.

9. The system claim 1, wherein the method further comprises the step of identifying an anomaly.

10. The system of claim 1, wherein the method further comprises the step of reporting one or more of the most relevant insights.

11. The system of claim 1, wherein the first server is the same as the second server.

12. The system of claim 1, wherein the step of collecting the mentions further comprises establishing a search inquiry.

13. The system of claim 1, wherein the step of collecting the mentions may be limited by prescribed time interval or may be continual.

14. A method for detection of the most relevant insights for any large volume query-based social data stream comprising the steps of:
   interfacing with one or more streaming social data sources;
   collecting one or more mentions that match a search query;
   storing said mentions on a first server;
   enhancing said mentions with additional information to produce enhanced mentions;
   storing said enhanced mentions on a second server;
   filtering said enhanced mentions into filtered streams;
   aggregating statistical data of said filtered streams; and
   analyzing for an anomaly in the statistical data of each of said filtered streams to detect the most relevant insights using a hybrid statistical approach adapted to the volume and steadiness of the data of the filtered streams, such that the most relevant insights for the streaming social data sources are detected and a real-time alert may be generated based on the detected anomaly or insight.

15. The method of claim 14, wherein the method further comprises the step of identifying an anomaly.

16. The method of claim 14, wherein the method further comprises the step of reporting one or more of the most relevant insights.

17. The method of claim 14, wherein the first server is the same as the second server.

18. The method of claim 14, wherein the step of collecting the mentions further comprises establishing a search inquiry.

19. The method of claim 14, wherein the step of collecting the mentions may be limited by prescribed time interval or may be continual.

20. The method of claim 14, wherein the data sources are selected from the group consisting of social network or websites where an author can be uniquely identified, and any combination thereof.

* * * * *